US006971172B2

(12) United States Patent
Crofts

(10) Patent No.: US 6,971,172 B2
(45) Date of Patent: Dec. 6, 2005

(54) PIEZOELECTRIC CONTROL VALVE ADJUSTMENT METHOD

(75) Inventor: John D. Crofts, Edinburgh, IN (US)

(73) Assignee: Cummins Inc., Columbus, IN (US)

( * ) Notice: Subject to any disclaimer, the term of this patent is extended or adjusted under 35 U.S.C. 154(b) by 90 days.

(21) Appl. No.: 10/636,963

(22) Filed: Aug. 8, 2003

(65) Prior Publication Data

US 2005/0056706 A1 Mar. 17, 2005

(51) Int. Cl.[7] ........................... F16K 31/02; B05B 1/08
(52) U.S. Cl. ........................... 29/890.125; 29/890.123; 29/890.124; 29/890.126; 29/890.128; 29/890.132
(58) Field of Search .................... 29/890.122, 890.124, 29/890.125, 890.126, 890.128, 890.132; 251/129.15, 129.18, 129.2; 239/584, 585.1–585.5

(56) References Cited

U.S. PATENT DOCUMENTS

| | | | | |
|---|---|---|---|---|
| 3,995,813 A | | 12/1976 | Bart et al. | |
| 4,022,166 A | | 5/1977 | Bart | |
| 4,524,613 A | * | 6/1985 | Uchida | 73/119 A |
| 4,821,726 A | | 4/1989 | Tamura et al. | |
| 5,031,841 A | | 7/1991 | Schäfer | |
| 5,094,430 A | | 3/1992 | Shirai et al. | |
| 5,100,100 A | | 3/1992 | Benson et al. | |
| 5,205,147 A | | 4/1993 | Wada et al. | |
| 5,740,969 A | * | 4/1998 | Hoffmann et al. | 239/533.2 |
| 5,803,361 A | | 9/1998 | Horiuchi et al. | |
| 6,131,829 A | * | 10/2000 | Ricco | 239/585.1 |
| 6,298,829 B1 | | 10/2001 | Welch et al. | |
| 6,326,717 B1 | | 12/2001 | Mattes | |
| 6,499,467 B1 | | 12/2002 | Morris et al. | |
| 6,705,587 B1 | * | 3/2004 | Frank et al. | 251/129.06 |

FOREIGN PATENT DOCUMENTS

| | | | |
|---|---|---|---|
| DE | 3540660 | * | 5/1987 |
| DE | 19752028 | * | 6/1999 |
| JP | 63-111283 | * | 5/1988 |
| JP | 04-347363 | * | 12/1992 |
| JP | 2002-295713 | * | 10/2002 |
| JP | 2003-113754 | * | 4/2003 |
| WO | 96/41947 | * | 12/1996 |
| WO | WO-00/68563 A2 | | 11/2000 |

* cited by examiner

*Primary Examiner*—Eric Compton
(74) *Attorney, Agent, or Firm*—Nixon Peabody LLP; Tim L. Brackett, Jr.; J. Bruce Schelkopf

(57) ABSTRACT

A method for adjusting piezoelectric valve components to create a precise interface between a piezoelectric actuator and a movable valve plunger is provided which includes the steps of conducting a coarse adjustment prior to assembly followed by a fine adjustment after assembly. The method includes measuring a first difference between a valve body and a valve plunger, and compensating for this first measured difference such that surfaces of the valve body and the valve plunger are in a common plane. A second common plane is established between an end surface of an actuator housing and an end of an actuator rod. The step of compensating for the first measured difference can comprise machining the surfaces in the first common plane or using a shim. A second adjustment is conducted by rotating a nut disposed axially with the actuator rod to adjust the axial position of the valve plunger.

15 Claims, 4 Drawing Sheets

PIEZOELECTRIC CONTROL VALVE ADJUSTMENT METHOD

BACKGROUND OF THE INVENTION

1. Field of the Invention

The present invention relates to a method of adjusting piezoelectric valve components of a fuel injector device to establish and maintain a precise interface between a piezoelectric actuator and a movable valve plunger, and more particularly to, a process of establishing a matched interface between the valve components.

2. Description of Related Art

Piezoelectric devices are desirable for use as valve, actuators for several reasons. One being that the devices allow for precise metering and control of small quantities of pressurized fuel. Another desirable feature is that piezoelectric actuators have reliable characteristics when calibrated properly and precisely. However, in a fuel injection valve, the amount of displacement of a piezoelectric element necessary to move the valve element through its valve stroke is very small. Therefore, it is necessary to take into account the small amount of displacement when calibrating, making precise calibration difficult.

Moreover, establishing an accurate interface between a piezo actuator and movable valve element can be difficult and costly due to small strokes and large forces associated with piezoelectric actuators. Stack-up tolerances due to the assembly of various components also make it difficult to create a match or flush interface between the actuator and valve element.

In U.S. Pat. No. 5,205,147, an adjustment screw is rotated for course adjustment of the axial position of the actuator. Secondly, a tapered wedge is used to make fine adjustments in the actuator position before being secured with a pin and second adjusting screw. However, the coarse and fine adjustments are made to adjust the position of the entire actuator, not to adjust the compressive preload.

U.S. Pat. No. 6,326,717 discloses an adjustment nut which engages the external threads of an extension bolt disposed on a top plate of the actuator body to adjust the pre-stressing forces of a pair of spring bands. The adjustment nut is in series with the piezoelectric element stack and end plate, i.e., the operational load path. An adjustment results in an equal movement of the tappet thereby making fine adjustments in the axial position of the tappet very difficult.

Thus, there is a need for an accurate and low cost method of adjusting the piezoelectric actuator and valve components to allow for a precise offset therebetween.

SUMMARY OF THE INVENTION

An object of the present invention is to solve the above problems by providing a simple, effective process of setting, including adjusting, the position of valve components.

Another object of the present invention is to provide a method for matching the interface between a valve plunger and an actuator rod of a fuel injector, thereby enabling more precise control of preselected fuel delivery amounts.

Still another object of the present invention is to provide a method for accomplishing a more fine adjustment of a piezoelectric actuator's position relative to a valve plunger by increasing or decreasing the preload of a piezoelectric stack of elements.

Another object of the present invention is to provide a method which corrects for the inability to assemble all injector and actuating components without stack-up tolerances thereby providing a method which to compensate for these stack-up tolerances. In one embodiment, the actuator rod and actuator housing are precisely ground in the same plane and/or a shim is provided to place the valve plunger and valve housing in a common plane, which upon assembly, creates a common plane for all surfaces.

In establishing these and other objects of the present invention, there is provided a method for adjusting piezoelectric valve components to establish and maintain a precise interface between a piezoelectric actuator and a movable valve plunger, the method including the steps of providing a valve body and valve plunger. The valve body has a first surface, and the valve plunger has first and second opposed ends. A first difference between the first surface of the valve body and the first end of the valve plunger is measured. The first measured difference of the valve components is then substantially eliminated, or compensated for, such that the first surface of the valve body and the first end of the valve plunger are in a first common plane. A piezoelectric actuator rod movably disposed in an actuator housing is provided. The piezoelectric actuator rod has opposed first and second ends and the actuator housing has an end surface. A second common plane is established between the end surface of the actuator housing and the second end of the actuator rod. A fine adjustment is conducted by rotating at least one nut disposed axially with the actuator rod to adjust the axial position of the actuator rod.

The step of initially compensating for, or substantially eliminating, the first measured difference can comprise machining the first surface of the valve body and the first end of the valve plunger in the first common plane. The step of initially compensating for the first measured difference may alternatively comprise positioning a shim within a recess formed between the first surface of the valve housing and the first end of the valve plunger, the shim having a width equal to the first measured difference. The step of establishing the second common plane can comprise machining the end surface of the actuator housing and the second end of the actuator rod to position these surfaces in the second common plane.

The at least one nut may include an inner adjustment nut mounted on the actuator rod. The position of the piezoelectric actuator rod can be adjusted by rotating the inner adjustment nut of the piezoelectric actuator to perform a fine adjustment of the preload.

DETAILED DESCRIPTION OF THE INVENTION

Figure 1:
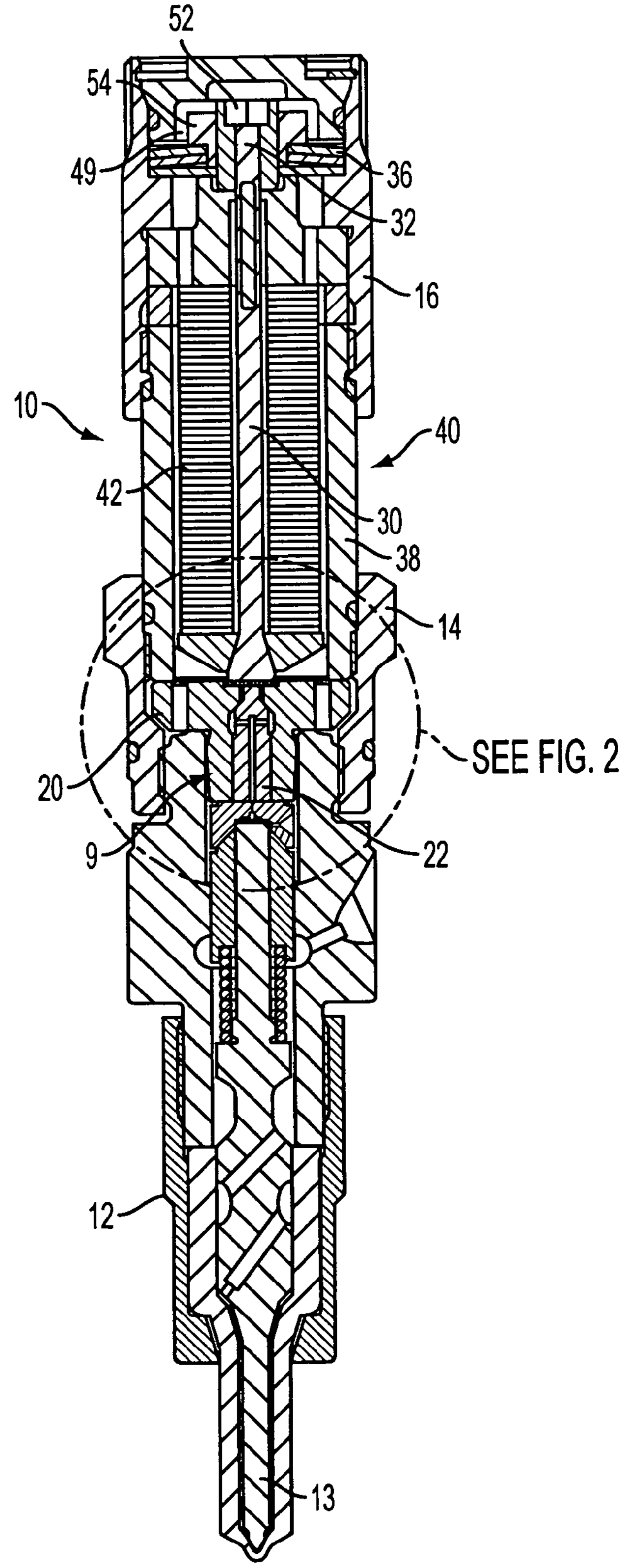
FIG. 1 is a cross-sectional view of a fuel injector adjusted according to the present invention.

FIGS. 1–4 illustrate a fuel injector assembly 10 including a piezoelectric actuator 40 and a control valve 9 whose cooperating surfaces have been adjusted and set to create a matched interface thereby substantially eliminating a gap between the surfaces and enhancing valve control and thus fuel injection control. Fuel injector assembly 10 also includes a nozzle assembly 12, an outer cylindrical housing 14, and a valve cap 16. The control valve 9 includes a control valve body 20 and a control valve plunger 22 extending centrally therethrough. Both valve plunger 22 and valve body 20 include the appropriate conduits to allow for fluid flow during fuel injection. Nozzle assembly 12 includes a movable nozzle valve element 13 for controlling fuel injection. Actuator 40 controls the movements of valve plunger 22 which, in turn, controls the movement of nozzle valve element 13 to effectively and precisely control the timing and quantity of the fuel injected. U.S. Pat. No. 6,499,467 discloses the structure and function of the fuel injector assembly discussed above, the entire contents of which are hereby incorporated by reference.

Figure 2:
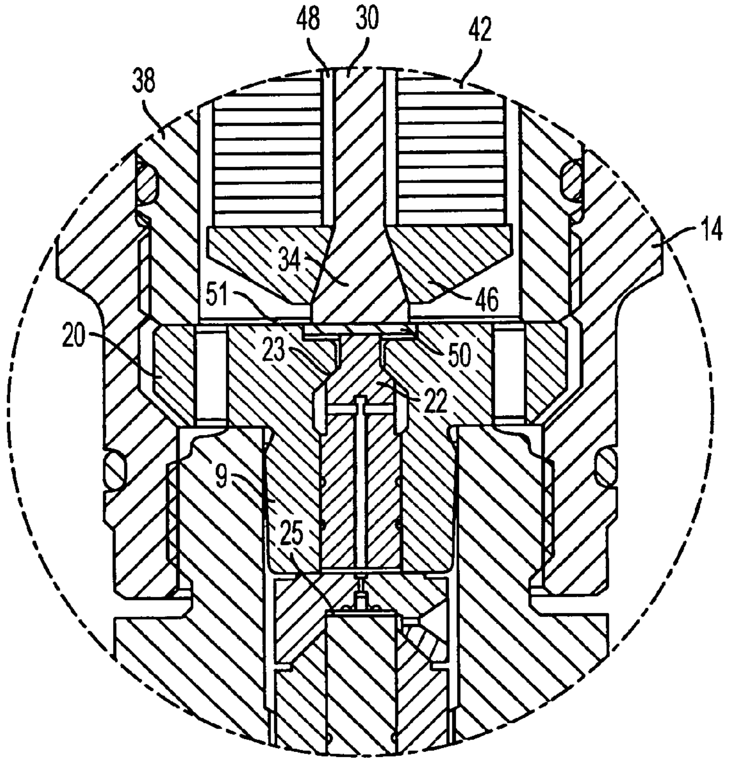
FIG. 2 is an enlarged cross-section of the fuel injector assembly of FIG. 1.
Figure 3:
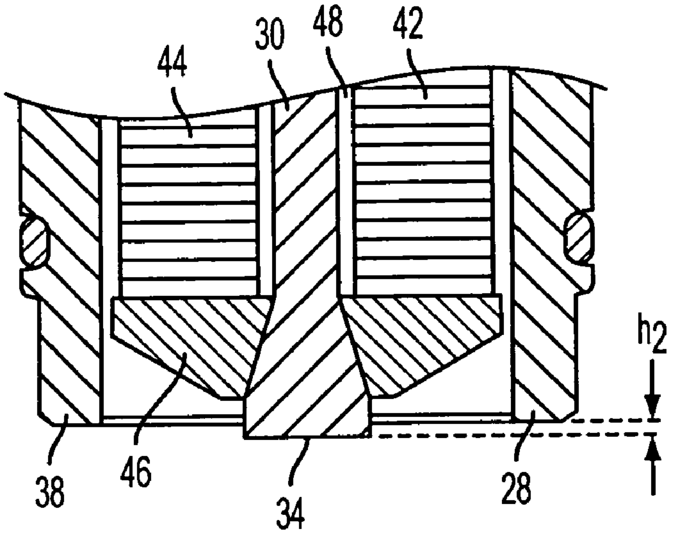
FIG. 3 illustrates an enlarged cross-section of one end of the actuator of the present invention.

As shown in FIGS. 1–3, piezoelectric actuator assembly 40 includes a piezoelectric element 42 formed of a plurality of stacked piezoelectric elements or discs 44, e.g. ceramic elements, disposed in an actuator housing portion 38. Mounted in a central passage 48 of the piezoelectric stack 42 is an actuator rod 30 having a first end 32 and a second end or surface 34. Discs 44 rest on a platform 46 positioned at the second end 34 of the rod 30. Referring to FIG. 1, the upper end of housing 38 is received within valve cap 16. A plurality of spring washers 36, i.e. Bellville-type, and a preloading nut assembly 49 are mounted at first end 32 of actuator rod 30 to apply a preload compressive force to the stack of piezoelectric discs 44 to ensure effective expansion and contraction of the piezoelectric discs during energization and de-energization, respectively. Referring to FIG. 2, the lower end of housing 38 is disposed within outer cylindrical housing 14. When the injector is assembled, second end 34 of actuator rod 30 abuts an upper end or surface 24 of plunger 22 to create an interface. Simultaneously, an end surface 28 of actuator housing 38 (FIG. 3) abuts an upper surface 21 of valve body 20 (FIG. 4).

Figure 4:
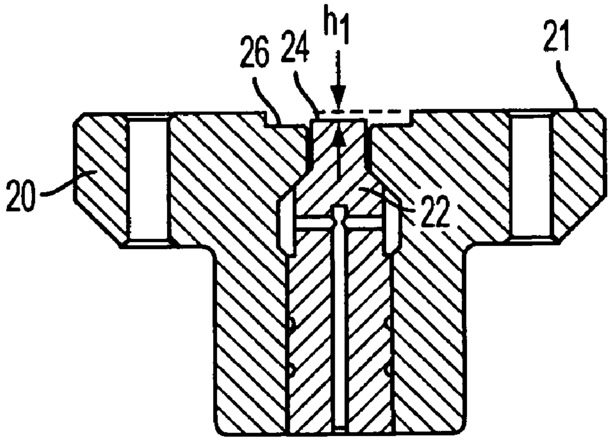
FIG. 4 is an enlarged cross-sectional view of an end of the valve plunger and valve body of present invention.

Referring to FIGS. 3 and 4, surfaces 21, 24 of the valve body and valve plunger, respectively, and surfaces 28, 34 of the actuator housing and actuator rod, respectively, are matched to provide a preliminary, coarse adjustment of the piezoelectric actuator and control valve interface. One method of accomplishing the initial, coarse adjustment includes assembling the valve plunger 22 and valve body 20. If the upper end 24 of valve plunger 22 is short of upper surface 21 of valve body 20, that is, positioned below the plane of surface 21 as shown in FIG. 4, the initial, coarse adjustment can be accomplished by measuring this first difference or height $h_1$, which is the distance between surface 24 of the valve plunger and surface 21 of the valve body. As shown in FIG. 2, height $h_1$ is then substantially eliminated by selecting a shim 50 having a width which is equal to the height $h_1$ and positioning shim 50 within a recess 26. As a result, the end surface of the shim 50, and thus effectively, the end surface of the valve plunger, is positioned in a common plane with the surface 21 of the valve housing or body 20. During operation of the injector, the surfaces of the shim 50 will abut against second end 34 of actuator 30 and surface 24 of valve plunger 22 to compensate for any offset therebetween. Alternatively, if upper end 24 extends beyond upper surface 21, the surfaces can be ground or machined into a common plane with a minimal offset, e.g., zero in some cases.

The initial, coarse adjustment also includes eliminating any differences between end surface 28 of actuator housing 38 and second end 34 of the actuator rod. In the preferred embodiment, this is accomplished by machining the surfaces such that a common plane is established across the surface 28 and second end 34. It should be appreciated that although second end 34 of the rod is shown to extend from surface 28 of the actuator housing, second end 34 can be inward of surface 28. In this situation, a common plane would preferably still be formed by machining the surfaces.

It should be appreciated that other matching means are contemplated which would result in a common plane between the surfaces to provide for an initial course adjustment of the components of the control valve. For example, the initial, coarse adjustment can be accomplished by measuring the height $h_1$ of a plurality of stock of valve plungers 22 and bodies 20. Likewise, a plurality of actuator rods 30, piezo element assemblies 42 and housings 38 can be assembled and the various heights $h_2$ (FIG. 3), i.e., the length or distance that rod 30 extends within or from the surface 28 of actuator housing 38, can be measured and recorded. Based upon these recorded measurements, chosen valve and plunger sets can be assembled with pre-selected actuator rod assemblies based upon the closest matched heights $h_1$ and $h_2$.

It should be appreciated that the term “matched” or “matching” used herein means that, when the valve components are assembled, the surfaces are positioned immediately adjacent one another to within about as small as a clearance therebetween as possible, if any, and/or height $h_1$ equals $h_2$, within about as small of a tolerance as possible.

During normal operation of the fuel injector nozzle, piezoelectric element 42 changes dimensions with the imposition of an electric field, either expanding or contracting to move the actuator rod and hence the valve plunger 22 to open or close, respectively, a valve port 23 to control fuel flow from, for example, a control volume 25 (FIG. 2). By matching the interfacing surfaces, i.e., the actuator housing end surface 28 which interfaces with the upper surface 21 of valve body 20 and the second end 34 of actuator rod 30 which interfaces with shim 50 disposed within recess 26, which in turn interfaces with the end surface 24 of valve plunger 22, the amount of movement of the valve plunger can be precisely controlled. The surfaces can be machined by grinding, milling or turning, for example, on a high-speed lathe. By this method, a minute clearance, for example, of and about 5 to 10 microns, can be achieved.

Figure 5:
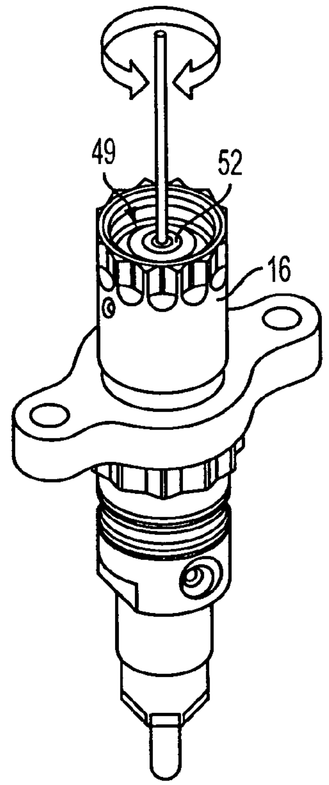
FIG. 5 is a perspective view of the fuel injector assembly and actuator adjustment nut.

The second step of the method of the present invention functions to provide a precise, fine adjustment to the axial position of the actuator rod by making slight adjustments in the actuator preload assembly. Referring to FIGS. 1 and 5, preloading nut assembly 49 includes an inner adjustment nut 52 disposed axially with rod 30 and an outer adjustment nut 54. Both nuts are disposed in the interior of valve cap 16 and can be turned to adjust the longitudinal position of piezoelectric rod 30. The adjustment nuts 52, 54 are located centrally in the injector to be accessible while the injector is being tested.

Piezoelectric discs 44 are preloaded by spring washers 36 by rotation of outer nut 54 during the initial assembly of the piezo actuator assembly 40. During rotation of outer nut 54, inner nut 52 does not rotate. After the initial coarse adjustment and assembly of the injector, the fine adjustment step of the matching process of the present invention is accomplished by loosening or tightening nut 52 to axially move the actuator rod 30 slightly relative to valve plunger 22. Specifically, for fine adjustment, inner nut 52 may be rotated relative to nut 54 so as to loosen nut 52 and move rod 30 downwardly in FIG. 1, toward valve plunger 22 a very small axial distance with an insignificant change in preload force on discs 44. This fine adjustment results in the interface between rod surface 34 and valve plunger end 24 having a desired minimal clearance of, for example, about one micron. Adjustment, i.e. rotation, of inner nut 52 compensates for the inherent clearance at the interface resulting from, not only the preliminary or coarse adjustment, but also differing amounts of component distortion from assembly and fuel pressure loads, thereby enabling consistent injector to injector performance. Of course, nut 52 may also be tightened to pull rod 30 upwardly, if desirable. Once the fine adjustment has been made, a cover (not shown) may be placed over the adjustment nut.

Importantly, adjustment nut 52 is positioned in series with the load path of the preload force, not parallel to the load path, thereby permitting controlled fine adjustment using the resistance of the preload. Also, because there is a difference in compressibility between spring washers 36 and stack 42, i.e. spring washers 36 being more compressible, when the inner nut is rotated, most of the axial movement is absorbed by the spring washers 36 with little axial movement at the outer end 34 of the rod, thereby enhancing the fine adjustment. The threaded portions of nut 52 and the outer nut 54 (FIG. 1) may also have different pitches to further facilitate a precise matching adjustment.

Figure 6:
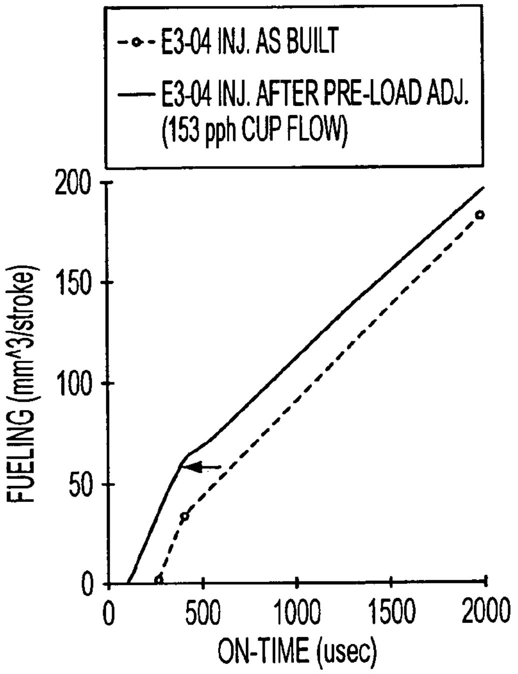
FIG. 6 is a graphical representation of the relationship between the interface adjustment and injector performance.

FIG. 6 is a graphical representation of the relationship between the piezoelectric adjustment and injector performance. The test results of the graph of FIG. 6 illustrate performance when the valve is built according to the method of the present invention. The dashed line indicates injector performance after the valve and actuator interface has been adjusted, i.e., matched using the first step of the adjustment process of the present invention. The solid line in the graph indicates injector performance after the second step of the adjustment process according to the present invention has occurred, i.e., after fine adjustment with nut 52 of the preload nut assembly. As can be seen, more precise amounts of fuel can be delivered per stroke when the preload of the components has been precisely adjusted.

The two-step, i.e., coarse and fine adjustments, method of the present invention allows for the mating surfaces of the actuator assembly and the control valve to be easily matched to, i.e. achieve an interface having a clearance of, about a 1–5 micron. First, the initial coarse adjustment can be accomplished by either using a shim and/or machining the components to provide for a common plane between the valve plunger/body and the actuator rod/housing resulting in a matched interface having approximately a 5–10 micron clearance. Fine adjustment can then be made during a functional test of the complete injector assembly to achieve the 1–5 micron clearance and possibly even less than 1 micron. This second step of the process makes very slight adjustments in the axial position of the rod by increasing or decreasing the actuator's preload through rotation of the inner adjustment nut 52 to establish a precise matched interface between rod 30 and valve plunger 22. If a gap exists at the interfaces of the surfaces, then there is an undesirable transition time or delay between actuation and opening of the valve. The present invention incorporates a fully accessible, operational adjustment nut that permits fine adjustment in the rod position.

Although the present invention has been described in relation to particular embodiments thereof, many other variations and modifications and other uses will become apparent to those skilled in the art. The present invention therefore is defined by the appended claims and legal equivalents.

What is claimed is:

1. A method for adjusting piezoelectric valve components to establish and maintain a precise interface between a piezoelectric actuator and a movable valve plunger, the method comprising the steps of:

providing a valve body and the valve plunger, the valve body having a first surface, and the valve plunger having first and second opposed ends;

measuring a first difference between the first surface of the valve body and the first end of the valve plunger;

substantially eliminating said first measured difference of the valve components, such that the first surface of the valve body and the first end of the valve plunger are in a first common plane;

providing a piezoelectric actuator rod movably disposed in an actuator housing, the piezoelectric actuator rod having opposed first and second ends and the actuator housing having an end surface;

establishing a second common plane between the end surface of the actuator housing and the second end of the actuator rod; and conducting a fine adjustment by rotating at least one nut disposed axially with the actuator rod to adjust the axial position of the actuator rod.

2. The method of claim 1, wherein the step of substantially eliminating said first measured difference comprises machining the first surface of the valve body and the first end of the valve plunger in the first common plane.

3. The method of claim 1, wherein the step of substantially eliminating said first measured difference comprises positioning a shim within a recess formed between the first surface of the valve body and the first end of the valve plunger, the shim having a width equal to the first measured difference.

4. The method of claim 1, wherein the step of establishing the second common plane comprises machining the end surface of the actuator housing and the second end of the actuator rod along the second common plane.

5. The method of claim 1, wherein the step of conducting the fine adjustment comprises slightly adjusting a preload of the piezoelectric actuator.

6. The method of claim 1, wherein said at least one nut is an inner adjustment nut mounted on the first end of the actuator rod, the step of conducting the fine adjustment comprises finely adjusting a preload of the piezoelectric actuator by tightening said inner adjustment nut.

7. The method of claim 6, further including an outer adjustment nut, said inner and outer adjustment nuts being independently adjustable.

8. A method for adjusting piezoelectric valve components to establish and maintain a precise interface between a piezoelectric actuator and a movable valve plunger, the method comprising the steps of:

providing a valve body and the valve plunger, the valve body having a first surface, and the valve plunger having first and second opposed ends;

providing a piezoelectric actuator abutment means movably disposed in an actuator housing for abutting said valve plunger, the piezoelectric actuator abutment means having opposed first and second ends and the actuator housing having an end surface;

conducting an initial adjustment to eliminate a difference between the first surface of the valve body and the first end of the valve plunger and to establish a common plane between the end surface of the actuator housing and the second end of the actuator abutment means; and conducting a second adjustment by turning at least one nut disposed axially with the actuator abutment means to adjust the axial position of the actuator abutment means.

9. The method of claim 8, wherein the step of conducting the initial adjustment includes establishing the first surface of the valve body and the first end of the valve plunger in a first common plane.

10. The method of claim 8, wherein the step of conducting the initial adjustment includes establishing a second common plane between the end surface of the actuator housing and the second end of the actuator abutment means.

11. The method of claim 9, wherein the step of conducting the initial adjustment includes machining the first surface of the valve body and the first end of the valve plunger in the first common plane.

12. The method of claim 9, wherein the step of conducting an initial adjustment further comprises measuring a first difference between the first surface of the valve body and the first end of the valve plunger and positioning a shim within a recess formed between the first surface of the valve body and the first end of the valve plunger, the shim having a width equal to the first measured difference.

13. The method of claim 10, wherein the step of establishing the second common plane comprises machining the end surface of the actuator housing and the second end of the actuator abutment means along the second common plane.

14. The method of claim 8, wherein the step of conducting the second adjustment comprises slightly adjusting a preload of the piezoelectric actuator.

15. The method of claim 14, wherein said at least one nut is an inner adjustment nut mounted on the first end of the actuator abutment means, the step of conducting the second adjustment comprises finely adjusting a preload of the piezoelectric actuator by tightening said inner adjustment nut.

* * * * *